(12) United States Patent
Carlson

(10) Patent No.: US 6,659,524 B1
(45) Date of Patent: Dec. 9, 2003

(54) RETRACTABLE CARGO BED

(76) Inventor: Ronald Frederick Carlson, 9308-150 Avenue, Edmonton, Alberta (CA), T5E 2N8

( * ) Notice: Subject to any disclaimer, the term of this patent is extended or adjusted under 35 U.S.C. 154(b) by 0 days.

(21) Appl. No.: 10/207,416

(22) Filed: Jul. 26, 2002

(51) Int. Cl.[7] .............................. B62C 1/06; B60P 1/00
(52) U.S. Cl. ..................................... 296/26.09; 414/522
(58) Field of Search ............................ 296/26.09, 37.1, 296/37.6, 39.1, 39.2, 26.08, 26.01; 414/522, 467; 224/281

(56) References Cited

U.S. PATENT DOCUMENTS

| | | | | |
|---|---|---|---|---|
| 2,284,419 A | * | 5/1942 | Greig | |
| 3,768,673 A | * | 10/1973 | Nydam et al. | |
| 4,305,695 A | | 12/1981 | Zachrich | 414/522 |
| 4,681,360 A | * | 7/1987 | Peters et al. | 296/37.6 |
| 4,909,558 A | | 3/1990 | Roshinsky | 296/37.6 |
| 4,950,123 A | | 8/1990 | Brockhaus | 414/522 |
| 5,064,335 A | | 11/1991 | Bergeron et al. | 414/522 |
| 5,098,146 A | * | 3/1992 | Albrecht et al. | |
| 5,513,941 A | | 5/1996 | Kulas et al. | 414/522 |
| 5,934,725 A | * | 8/1999 | Bowers | 296/26.09 |
| 5,938,262 A | * | 8/1999 | Mills | 296/26.09 |
| 6,065,792 A | * | 5/2000 | Sciullo et al. | 295/26.09 |
| 6,120,075 A | | 9/2000 | Terry | 296/26.09 |
| 6,244,646 B1 | | 6/2001 | Wheeler, III | 296/26.01 |
| 6,318,780 B1 | * | 11/2001 | St. Aubin | 296/26.09 |
| 6,328,364 B1 | | 12/2001 | Darbishire | 296/26.09 |
| 6,390,525 B2 | * | 5/2002 | Carpenter et al. | 296/26.09 |

* cited by examiner

*Primary Examiner*—Joseph D. Pape
*Assistant Examiner*—H. Gutman
(74) *Attorney, Agent, or Firm*—Christensen O'Connor Johnson Kindness PLLC

(57) ABSTRACT

A retractable cargo bed includes a stationary frame adapted for mounting onto a deck of a truck and a travelling frame movable relative to the stationary frame between a retracted position and an extended position. A locking mechanism is provided which includes stop members secured to the bottom of the stationary frame at spaced intervals. A locking lever is carried by the travelling frame which is pivotally mounted for movement about an axis which is parallel to a longitudinal axis of the travelling frame between a downwardly angled locking position and a substantially horizontal release position. The locking lever is biased into the locking position. A release lever is provided for manually moving the locking lever to the release position.

16 Claims, 5 Drawing Sheets

RETRACTABLE CARGO BED

FIELD OF THE INVENTION

The present invention relates to a retractable cargo bed of a truck, van or other service body vehicle.

BACKGROUND OF THE INVENTION

U.S. Pat. No. 5,513,941 (Kulas et al 1996) is an example of a retractable cargo bed. Such retractable cargo beds consist of a stationary frame which is adapted for mounting to a deck of a truck, van or other service vehicle, and a travelling frame which slides along the stationary frame. It is important that the retractable cargo beds have reliable locking mechanisms which prevent the uncontrolled movement of the travelling frame relative to the stationary frame. In the absence of a reliable locking mechanism, the travelling frame could extend uncontrollably. This is particularly the case when the truck is parked on a hill and the travelling frame is heavily loaded. Should the travelling frame extend uncontrollably, a person could be struck and sustain injuries. In severe cases, the person could become crushed against a wall or parked vehicle.

The Kulas et al reference has a locking mechanism which consists of a pin structure referred to as a "nipple" which is carried by a spring biased lever mounted on the travelling frame. The lever biases the pin into engagement with any one of a plurality of apertures positioned at spaced intervals along the stationary frame. Although the locking mechanism illustrated in the Kulas et al reference is better than many on the market, there is a fundamental flaw in a pin and aperture type of system. Under conditions when the locking mechanism is needed the most, the momentum of the travelling frame does not provide an opportunity for the pin to engage the apertures. As a result the pin travels rapidly past each aperture and the locking mechanism does not engage.

SUMMARY OF THE INVENTION

What is required is a retractable cargo bed with a more reliable locking mechanism.

According to the present invention there is provided a retractable cargo bed which includes a stationary frame adapted for mounting onto a deck of a truck, van or other service body vehicle. The stationary frame has a first end, a second end, a bottom and opposed sides having guide channels. A travelling frame is provided having a first end, a second end and opposed sides. The travelling frame is received within the stationary frame with the opposed sides of the travelling frame engaging the guide channels on the opposed sides of the stationary frame. The travelling frame is movable relative to the stationary frame between a retracted position and an extended position. A locking mechanism for controlling travel of the travelling frame along the stationary frame is provided which includes stop members secured to the bottom of the stationary frame at spaced intervals from the first end to the second end of the stationary frame. A locking lever is carried by the travelling frame. The locking lever is pivotally mounted for movement about an axis which is parallel to the longitudinal axis of the travelling frame between a downwardly angled locking position and a substantially horizontal release position. Means is provided for biasing the locking lever into the locking position whereby the locking lever engages one of the stop members secured to the bottom of the stationary frame. A release lever is provided for manually moving the locking lever to the release position.

The retractable cargo bed, as described above, with a locking lever that engages a stop member anchored to the bottom of the stationary frame, consistently engages even when the travelling frame is moving rapidly under heavy load.

Although beneficial results may be obtained through the use of the retractable cargo bed, as described above, it is preferred that the locking mechanism include an activation rod which extends from the first end to the second end of the travelling frame. The activation rod has a first end positioned adjacent to the first end of the travelling frame and a second end positioned adjacent to the second end of the travelling frame. The activation rod has a longitudinal axis and is mounted to the travelling frame for rotation about the longitudinal axis. The release lever is secured to the first end of the activation rod. The locking lever is secured to the second end of the activation rod.

Although beneficial results may be obtained through the use of the retractable cargo bed, as described above, the more rigid the activation rod can be maintained, the better the locking mechanism will work. Even more beneficial results may, therefore, be obtained when a plurality of transverse structural members extend between the opposed sides of the travelling frame and the activation rod extends through and is rigidly supported by the transverse structural members.

Although beneficial results may be obtained through the use of the retractable cargo bed, as described above, the preferred means of biasing the locking lever into the locking position is through the use of a spring. It is preferred that the spring exert a rotational force upon the activation rod to urge the locking lever into the locking position.

Although beneficial results may be obtained through the use of the retractable cargo bed, as described above, beneficial results have been obtained when the stop members are metal plates horizontally mounted in an angular orientation to guide the locking lever in against the stationary frame.

Although beneficial results may be obtained through the use of the retractable cargo bed, as described above, instead of the locking mechanism acting upon one of the sides, it is preferred that the stop members be secured to a centrally positioned longitudinal structural member on the stationary frame.

Although beneficial results may be obtained through the use of the retractable cargo bed, as described above, another problem often experienced with retractable cargo beds is a twisting of the stationary frame which occurs when the travelling frame is fully extended under load. Even more beneficial results may, therefore, be obtained when rigidifying reinforcing members extend down the opposed sides of the stationary frame.

Although beneficial results may be obtained through the use of the retractable cargo bed, as described above, another problem often experienced with retractable cargo beds is a pitching forward and downward of the travelling frame when fully extended. Even more beneficial results may, therefore, be obtained when the guide channels of the stationary frame have a top plate and a bottom plate, and the travelling frame has a top roller at the second end that engages the top plate and a bottom roller at the second end that engages the bottom plate. With this construction the second end of the travelling frame is supported both top and bottom when in a fully extended position.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
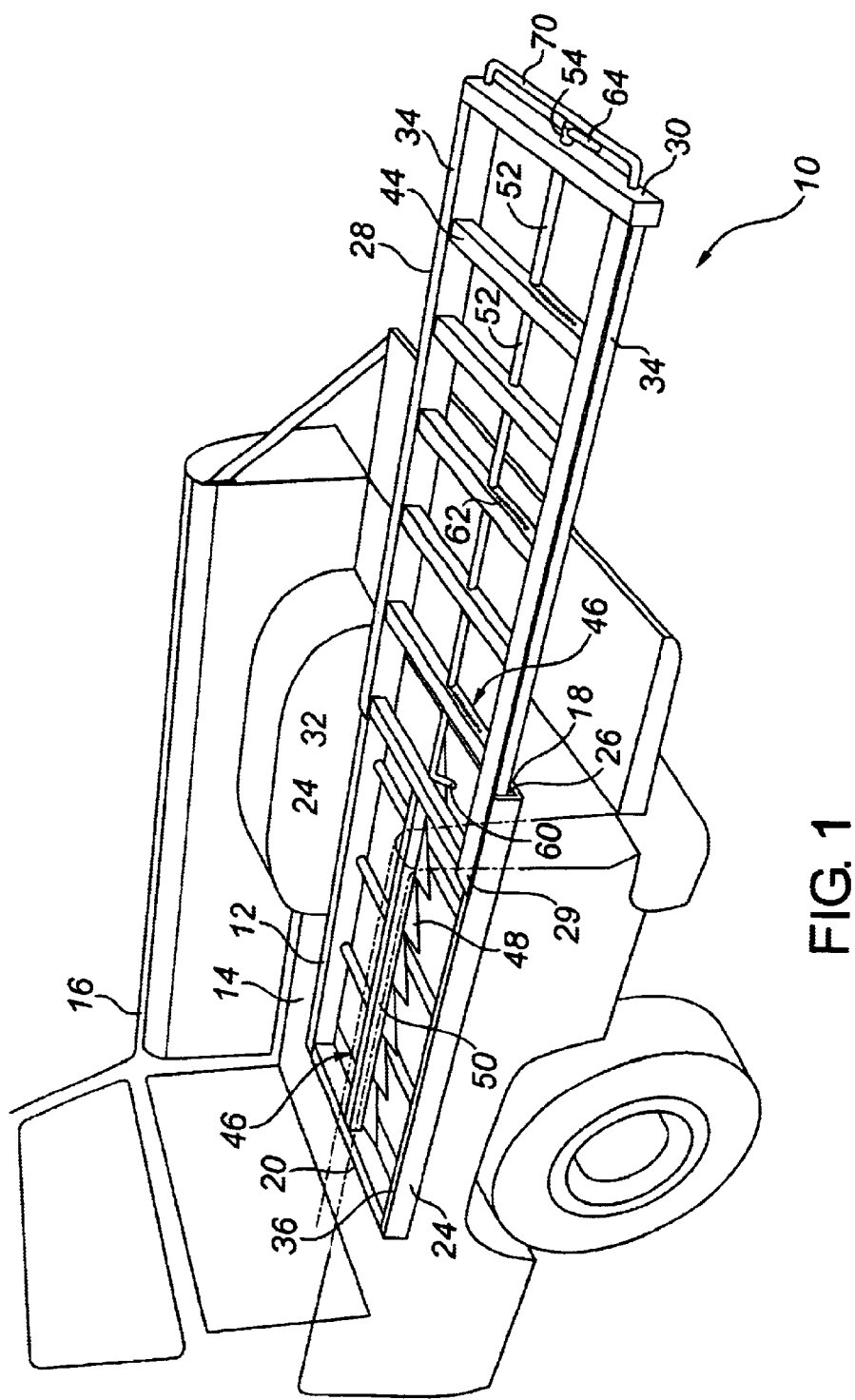
FIG. 1 is a perspective view of a retractable cargo bed constructed in accordance with the teachings of the present invention, in the extended position.

The preferred embodiment, a retractable cargo bed generally identified by reference numeral 10, will now be described with reference to FIGS. 1 through 5.

Structure and Relationship of Parts

Figure 2:
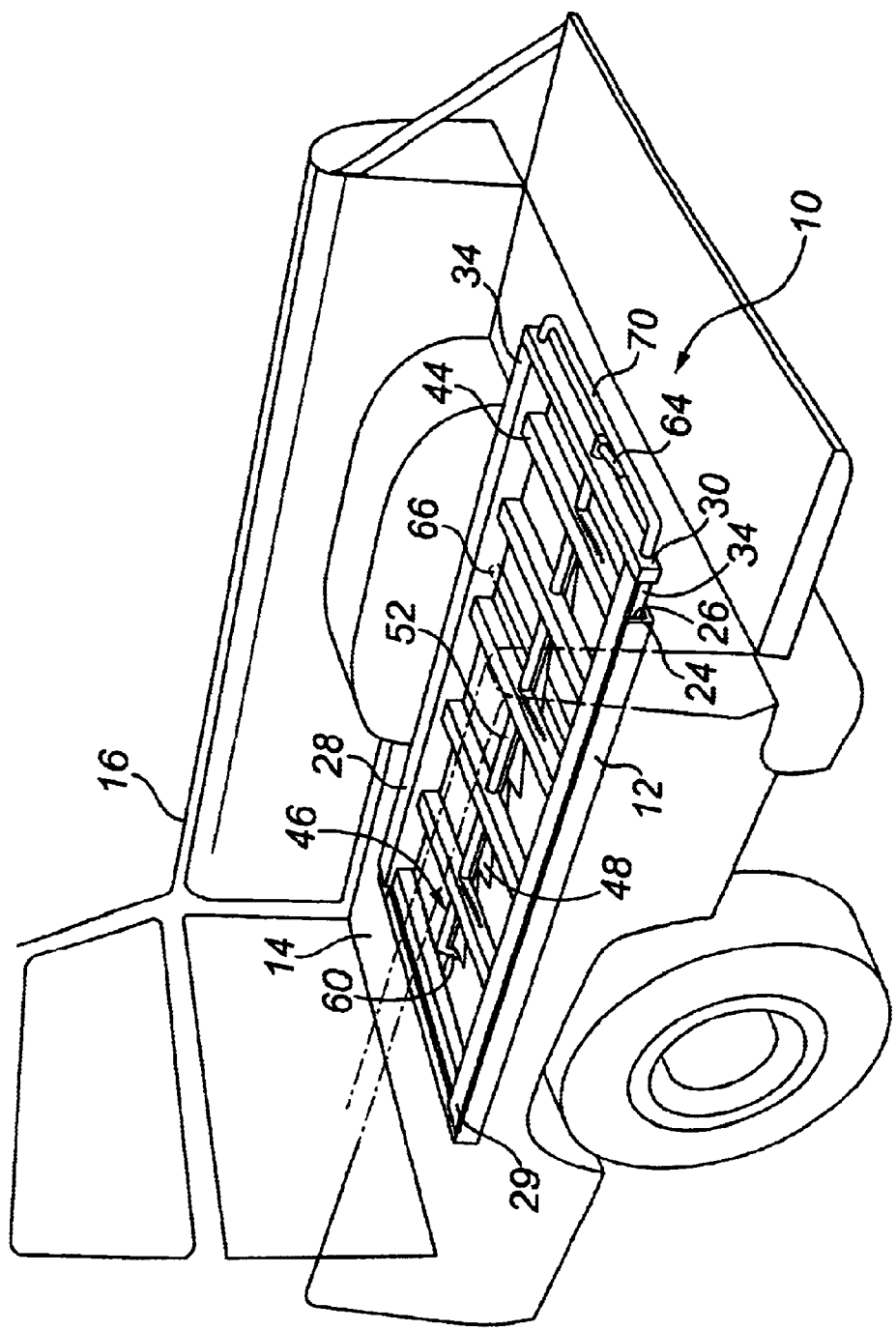
FIG. 2 is a perspective view of the retractable cargo bed illustrated in FIG. 1, in the retracted position.
Figure 3:
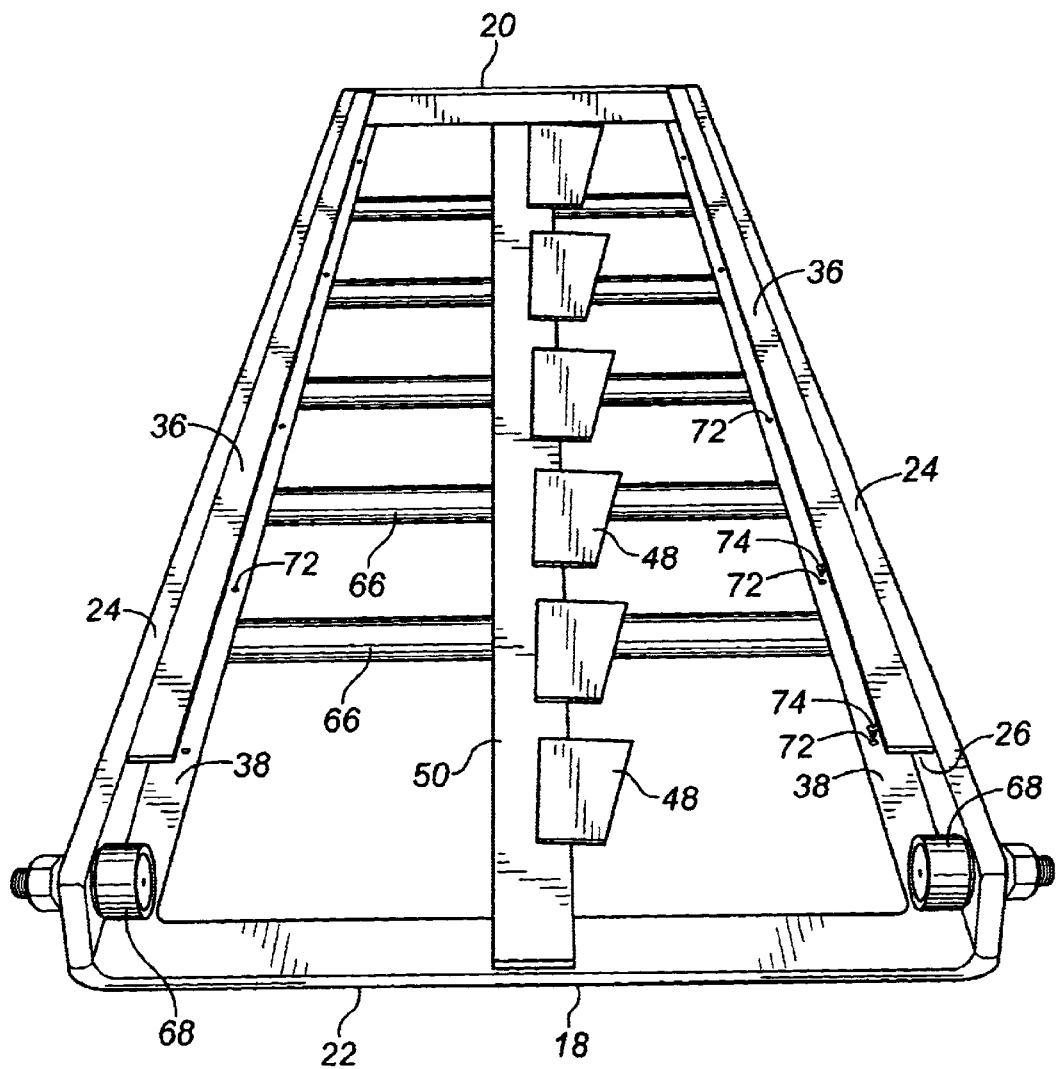
FIG. 3 is a perspective detailed view of the stationary frame of the retractable cargo bed illustrated in FIG. 1.
Figure 4:
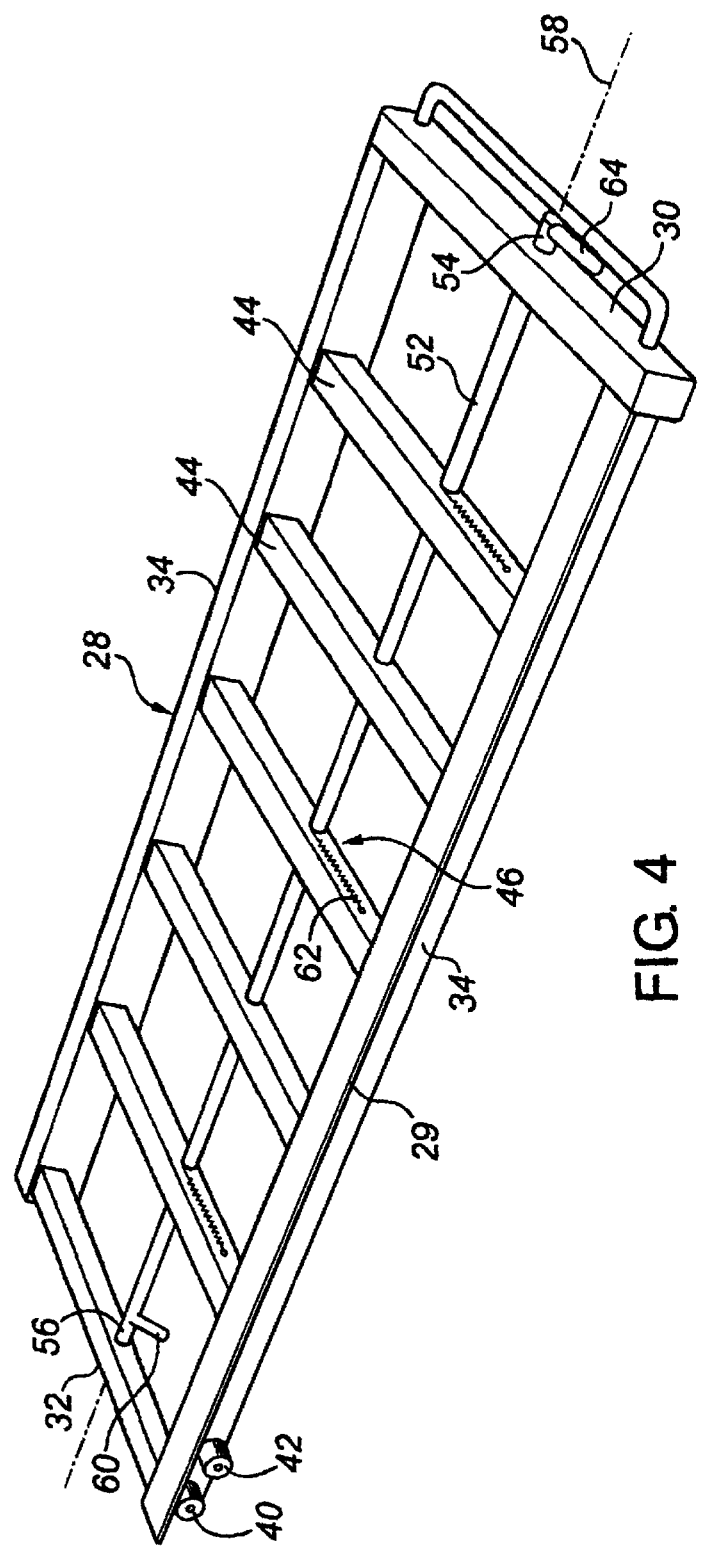
FIG. 4 is a perspective detailed view of the travelling frame of the retractable cargo bed illustrated in FIG. 1.
Figure 5:
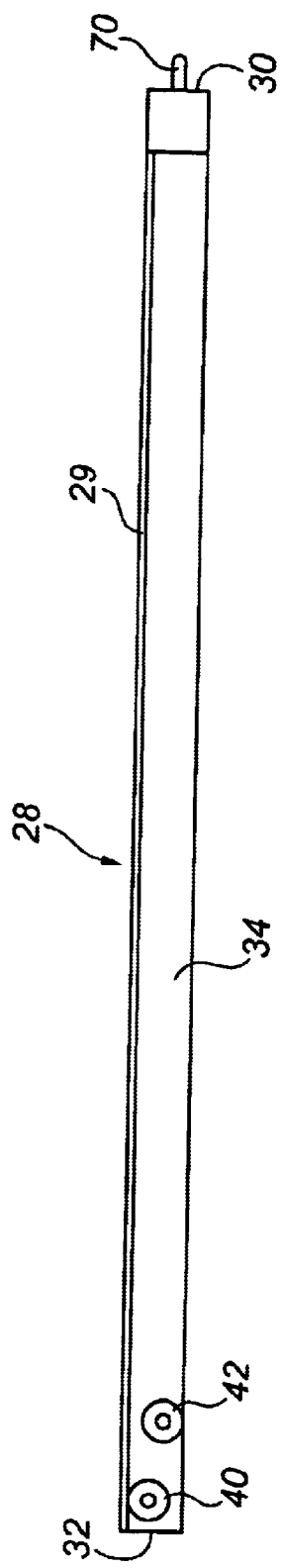
FIG. 5 is a side elevation view of the travelling frame of the retractable cargo bed illustrated in FIG. 4.

Referring to FIG. 1, retractable cargo bed 10 includes a stationary frame 12 which is adapted for mounting onto a deck 14 of a truck 16. Referring to FIG. 3, stationary frame 12 has a first end 18, a second end 20, a bottom 22 and opposed sides 24 which have guide channels 26. Referring to FIG. 4, a travelling frame 28 is provided that has a first end 30, a second end 32 and opposed sides 34. Referring to FIG. 1, travelling frame 28 is received within stationary frame 12 with opposed sides 34 of travelling frame 28 engaging guide channels 26 on opposed sides 24 of stationary frame 12. Referring to FIG. 3, guide channels 26 of stationary frame 12 have a top plate 36 and a bottom plate 38. Referring to FIG. 5, travelling frame 28 has a top roller 40 at second end 32 that engages top plate 36 illustrated in FIG. 3 and a bottom roller 42 at second end 32 that engages bottom plate 38 illustrated in FIG. 3, such that second end 32 of travelling frame 28 is supported both top and bottom to reduce pitched movement when in a fully extended position as illustrated in FIG. 1. Referring to FIG. 4, a plurality of transverse structural members 44 extend between opposed sides 34 of travelling frame 28. Referring to FIGS. 1 and 2, travelling frame 28 is movable relative to stationary frame 12 between a retracted position illustrated in FIG. 2 and an extended position illustrated in FIG. 1. Travelling frame 28 has outwardly extending side flanges 29 that overlie stationary frame 12.

Referring to FIG. 1, a locking mechanism generally referenced by numeral 46, is provided for controlling travel of travelling frame 28 along stationary frame 12. Referring to FIG. 3, locking mechanism 46 includes metal plates 48 which operate as stop members. Metal plates 48 are horizontally mounted in an angular orientation to a centrally positioned longitudinal structural member 50 along bottom 22 of stationary frame 12 at spaced intervals from first end 18 to second end 20 of stationary frame 12. Referring to FIG. 4, an activation rod 52 extends from first end 30 to second end 32 of travelling frame 28. Activation rod 52 extends through and is rigidly supported by transverse structural members 44 of travelling frame 28. Activation rod 52 has a first end 54 positioned adjacent to first end 30 of travelling frame 28 and a second end 56 positioned adjacent to second end 32 of travelling frame 28. Activation rod 52 has a longitudinal axis 58 and is mounted to travelling frame 28 for rotation about longitudinal axis 58. A locking lever 60 is secured to second end 56 of activation rod 52, so that upon rotation of activation rod 52, locking lever 60 is moved between a downwardly angled locking position and a substantially horizontal release position. Referring to FIG. 1, angular positioning of metal plates 48 which serve as stop members guide locking lever 60 in against centrally positioned longitudinal structural member 50 of stationary frame 12. Referring to FIG. 4, springs 62 act upon activation rod 52 to bias locking lever 60 into locking position whereby locking lever 60 engages one of metal plates 48 secured to bottom 22 of stationary frame 12 illustrated in FIG. 3. Referring to FIG. 4, a release lever 64 is secured to first end 54 of activation rod 52 for manually rotating activation rod 52 to move locking lever 60 to the release position. Referring to FIG. 3, rigidifying reinforcing members 66 extend down opposed sides 24 of stationary frame 12 to prevent twisting of stationary frame 12 when travelling frame 28 is fully extended under load as illustrated in FIG. 1. Referring to FIG. 3, rollers 68 are provided on first end 18 of stationary frame 12, to facilitate travel of travelling frame 28 illustrated in FIG. 4, when travelling frame is being moved relative to stationary frame 12. Referring to FIG. 1, a gripping handle 70 is provided at first end 30 of travelling frame 28 for the purpose of manually extending travelling frame 28. Referring to FIG. 3, apertures 72 are provided in bottom 22 of stationary frame 12 which are adapted to receive securing fasteners 74 for the purpose of securing stationary frame 12 to deck 14 of truck 16 illustrated in FIG. 1.

Operation

The use and operation of retractable cargo bed generally identified by reference numeral 10, will now be described with reference to FIGS. 1 through 5. Referring to FIG. 1, retractable cargo bed 10 is mounted to deck 14 of truck 16 by fasteners 74 which are inserted through apertures 72 in bottom 22 of stationary frame 12 illustrated in FIG. 3, to secure stationary frame 12 to deck 14 of truck 16. While the illustrated embodiment shows cargo bed 10 mounted to deck 14 of truck 16, it will be appreciated that retractable cargo bed 10 could also be installed in a variety of other vehicles such as vans, suburbans, SUV's, service bodies, fire and emergency vehicles and recreational vehicles.

Referring to FIG. 2, once stationary frame 12 has been secured to deck 14 of truck 16, travelling frame 28 is received within stationary frame 12 with opposed sides 34 of travelling frame 28 engaging guide channels 26 on opposed sides 24 of stationary frame 12.

Release lever 64 at first end 54 of activation rod 52 is rotated to rotate activation rod 52 which moves locking lever 60 to a substantially horizontal release position. Referring to FIG. 1, gripping handle 70 can then be used to manually move travelling frame 28 relative to stationary frame 12 between a retracted position illustrated in FIG. 2 and an extended position illustrated in FIG. 1. Referring to FIG. 1, when travelling frame 28 has been moved to the desired extended position, release lever 64 at first end 54 of activation rod 52 is released so that activation rod 52 which moves locking lever 60, rotates so that locking lever 60 moves to the downwardly angled locking position. Springs 62 act upon activation rod 52 to bias locking lever 60 into the locking position whereby locking lever 60 engages one of metal plates 48 secured to bottom 22 of stationary frame 12.

Referring to FIG. 5, top roller 40 at second end 32 of travelling frame 28 that engages top plate 36 of stationary frame 12 illustrated in FIG. 3 and bottom roller 42 at second end 32 of travelling frame 28 that engages bottom plate 38 of stationary frame 12 illustrated in FIG. 3, ensure that travelling frame 28 is supported both top and bottom to reduce downwardly pitched movement when in a fully extended position as illustrated in FIG. 1. The fact that travelling frame 28 has outwardly extending side flanges 29 that overlie stationary frame 12, adds further stability.

Referring to FIG. 2, when it becomes desirable to move travelling frame 28 to the retracted position, release lever 64 at first end 54 of activation rod 52 can be used to rotate activation rod 52 again, which will move locking lever 60 to the substantially horizontal release position. Should travelling frame 28 begin to gain momentum due to positioning on an incline, the biasing of springs 62 urge locking lever 60 back into locking engagement.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A retractable cargo bed, comprising:
    a stationary frame adapted for mounting onto a deck of a truck, the stationary frame having a first end, a second end, a bottom, opposed sides having guide channels, a centrally positioned longitudinal structural member extending between the opposed sides between the first end and the second end;
    a travelling frame having a first end, a second end and opposed sides, the travelling frame being received within the stationary frame with the opposed sides of the travelling frame engaging the guide channels on the opposed sides of the stationary frame, the travelling frame being movable relative to the stationary frame between a retracted position and an extended position;
    a locking mechanism for controlling travel of the travelling frame along the stationary frame, the locking mechanism including:
        stop members secured to the bottom of the stationary frame at spaced intervals along the centrally positioned longitudinal structural member;
        a locking lever carried by the travelling frame, the locking lever being pivotally mounted for movement about an axis which is parallel to the longitudinal axis of the travelling frame between a downwardly angled locking position and a substantially horizontal release position;
        means for biasing the locking lever into the locking position whereby the locking lever engages one of the stop members secured to the bottom of the stationary frame; and
        a release lever for manually moving the locking lever to the release position.

2. The retractable cargo bed as defined in claim 1, wherein an activation rod extends from the first end to the second end of the travelling frame, the activation rod having a first end positioned adjacent to the first end of the travelling frame and a second end positioned adjacent to the second end of the travelling frame, the activation rod having a longitudinal axis and being mounted to the travelling frame for rotation about the longitudinal axis of the activation rod, with the release lever secured to the first end of the activation rod and the locking lever secured to the second end of the activation rod.

3. The retractable cargo bed as defined in claim 2, wherein a plurality of transverse structural members extend between the opposed sides of the travelling frame and the activation rod extends through and is rigidly supported by the transverse structural members.

4. The retractable cargo bed as defined in claim 1, wherein the means for biasing the locking lever into the locking position is a spring.

5. The retractable cargo bed as defined in claim 1, wherein the stop members are metal plates horizontally mounted in an angular orientation to guide the locking lever in against the stationary frame.

6. The retractable cargo bed as defined in claim 1, wherein rigidifying reinforcing members extend down the opposed sides of the stationary frame.

7. The retractable cargo bed as defined in claim 1, wherein the guide channels of the stationary frame have a top plate and a bottom plate, and the travelling frame has a top roller at the second end that engages the top plate and a bottom roller at the second end that engages the bottom plate, such that the second end of the travelling frame is supported top and bottom when in the extended position.

8. A retractable cargo bed, comprising:
    a stationary frame adapted for mounting onto a deck of a truck, the stationary frame having a first end, a second end, a bottom and opposed sides having guide channels;
    a travelling frame having a first end, a second end and opposed sides, the travelling frame being received within the stationary frame with the opposed sides of the travelling frame engaging the guide channels on the opposed sides of the stationary frame, a plurality of transverse structural members extending between the opposed sides of the travelling frame, the travelling frame being movable relative to the stationary frame between a retracted position and an extended position;
    a locking mechanism for controlling travel of the travelling frame along the stationary frame, the locking mechanism including:
        stop members secured to the bottom of the stationary frame at spaced intervals from the first end to the second end of the stationary frame;
        an activation rod extending from the first end to the second end of the travelling frame, the activation rod extending through and being rigidly supported by the transverse structural members of the travelling frame, the activation rod having a first end positioned adjacent to the first end of the travelling frame and a second end positioned adjacent to the second end of the travelling frame, the activation rod having a longitudinal axis and being mounted to the travelling frame for rotation about the longitudinal axis;
        a locking lever secured to the second end of the activation rod, upon rotation of the activation rod the locking lever being moved between a downwardly angled locking position and a substantially horizontal release position;
        a spring acting upon the activation rod to bias the locking lever into the locking position whereby the locking lever engages one of the stop members secured to the bottom of the stationary frame; and
        a release lever secured to the first end of the activation rod for manually rotating the activation rod to move the locking lever to the release position.

9. The retractable cargo bed as defined in claim 8, wherein the stop members are metal plates horizontally mounted in an angular orientation to guide the locking lever in against the stationary frame.

10. The retractable cargo bed as defined in claim 8, wherein the stop members are secured to a centrally positioned longitudinal structural member on the stationary frame.

11. The retractable cargo bed as defined in claim 8, wherein rigidifying reinforcing members extend down the opposed sides of the stationary frame.

12. The retractable cargo bed as defined in claim 8, wherein the guide channels of the stationary frame have a top plate and a bottom plate, and the travelling frame has a top roller at the second end that engages the top plate and a bottom roller at the second end that engages the bottom plate, such that the second end of the travelling frame is supported top and bottom when in the extended position.

13. A retractable cargo bed, comprising:

a stationary frame adapted for mounting onto a deck of a truck, the stationary frame having a first end, a second end, a bottom and opposed sides having guide channels;

a travelling frame having a first end, a second end and opposed sides, the travelling frame being received within the stationary frame with the opposed sides of the travelling frame engaging the guide channels on the opposed sides of the stationary frame, a plurality of transverse structural members extending between the opposed sides of the travelling frame, the travelling frame being movable relative to the stationary frame between a retracted position and an extended position;

a locking mechanism for controlling travel of the travelling frame along the stationary frame, the locking mechanism including:

stop members secured to a centrally positioned longitudinal structural member along the bottom of the stationary frame at spaced intervals from the first end to the second end of the stationary frame, the stop members being in the form of metal plates that are horizontally mounted in an angular orientation;

an activation rod extending from the first end to the second end of the travelling frame, the activation rod extending through and being rigidly supported by the transverse structural members of the travelling frame, the activation rod having a first end positioned adjacent to the first end of the travelling frame and a second end positioned adjacent to the second end of the travelling frame, the activation rod having a longitudinal axis and being mounted to the travelling frame for rotation about the longitudinal axis;

a locking lever secured to the second end of the activation rod, upon rotation of the activation rod the locking lever being moved between a downwardly angled locking position and a substantially horizontal release position, the angular orientation of the metal plates which serve as stop members guiding the locking lever in against the centrally positioned longitudinal structural member of the stationary frame;

a spring acting upon the activation rod to bias the locking lever into the locking position whereby the locking lever engages one of the stop members secured to the bottom of the stationary frame; and a release lever secured to the first end of the activation rod for manually rotating the activation rod to move the locking lever to the release position.

14. The retractable cargo bed as defined in claim 13, wherein rigidifying reinforcing members extend down the opposed sides of the stationary frame, thereby preventing twisting of the stationary frame when the travelling frame is fully extended under load.

15. The retractable cargo bed as defined in claim 13, wherein the guide channels of the stationary frame have a top plate and a bottom plate, and the travelling frame has a top roller at the second end that engages the top plate and a bottom roller at the second end that engages the bottom plate, such that the second end of the travelling frame is supported both top and bottom to reduce pitched movement when the travelling frame is in the extended position.

16. The retractable cargo bed as defined in claim 13, wherein the travelling frame has outwardly extending side flanges that overlie the stationary frame.

* * * * *

UNITED STATES PATENT AND TRADEMARK OFFICE
CERTIFICATE OF CORRECTION

PATENT NO. : 6,659,524 B1
DATED : December 9, 2003
INVENTOR(S) : R.F. Carlson

It is certified that error appears in the above-identified patent and that said Letters Patent is hereby corrected as shown below:

Title page,
Item [30], Foreign Application Priority Data, insert in appropriate order
-- [30] Foreign Application Priority Data, Jul. 4, 2002 (CA) 2392444 --.

Signed and Sealed this

Eleventh Day of May, 2004

JON W. DUDAS
*Acting Director of the United States Patent and Trademark Office*